United States Patent [19]

Takano et al.

[11] Patent Number: 5,579,415
[45] Date of Patent: Nov. 26, 1996

[54] COMPUTER IMPLEMENTED METHOD OF RECOGNIZING A POSITION OF AN OBJECT

[75] Inventors: Misuzu Takano, Osaka-fu; Yoshihiro Itsuzaki, Nara-ken; Kinji Horikami; Masaya Nakao, both of Osaka-fu; Kazumasa Okumura, Kyoto-fu, all of Japan

[73] Assignee: Matsushita Electric Industrial Co., Ltd., Osaka-fu, Japan

[21] Appl. No.: 294,858

[22] Filed: Aug. 29, 1994

Related U.S. Application Data

[63] Continuation-in-part of Ser. No. 283,170, Aug. 3, 1994.

[30]    Foreign Application Priority Data

Aug. 6, 1993  [JP]  Japan .................................. 5-195964
Aug. 31, 1993 [JP]  Japan .................................. 5-215345

[51] Int. Cl.[6] ................................................. G06K 9/20
[52] U.S. Cl. ................................. 382/282; 382/199
[58] Field of Search .............................. 382/282, 141, 382/142, 143, 145, 151, 152, 153, 154, 199

[56]             References Cited

U.S. PATENT DOCUMENTS 4,581,762  4/1986  Lapidus et al. ....................... 382/141
4,618,989 10/1986  Tsukune et al. ...................... 382/125
4,969,202 11/1990  Groezinger ........................... 382/199
5,115,477  5/1992  Groezinger ........................... 382/199

*Primary Examiner*—Jose L. Couso
*Attorney, Agent, or Firm*—Wenderoth, Lind & Ponack

[57]                ABSTRACT

A method for position recognition, includes the steps of: picking up an image of an object having a circular arc shape as at least part of its profile, by an image pickup device; converting image information of the picked-up image in gray image data and storing the gray image data into a storage device; scanning the stored gray image with a profile scanning window composed of plural gray-level detection areas crossing an imaginary scanning circular profile corresponding to the shape on the gray image and arranged in circular along the scanning circular profile and using it to measure gray-level representative values of an inner- and outer-side gray-level detection areas inside and outside of the scanning circular profile; calculating, at each scanning position during scanning and for each detection area, an absolute value of a difference between the measured gray-level representative values of the inner- and outer-side gray-level detection areas; determining a number of such detection areas in which the absolute value of the difference is larger than a specified gray-level threshold value; detecting a position of the window where the calculated number of detection areas becomes a maximum with respect to their neighborhood, as a position of the shape of the object; and recognizing a position of the object from the detected position of the shape thereof.

18 Claims, 11 Drawing Sheets

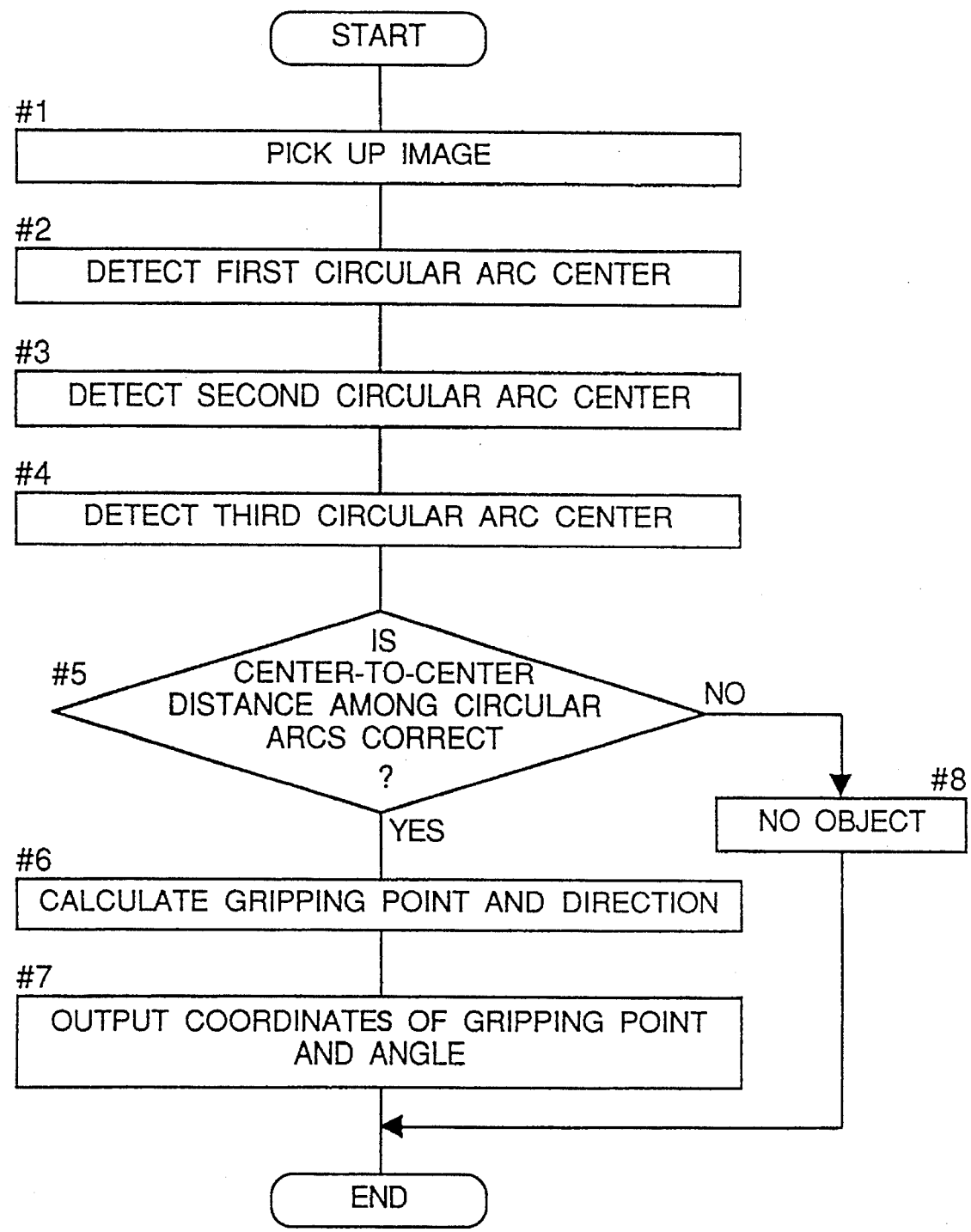

TO FIG. 7C

COMPUTER IMPLEMENTED METHOD OF RECOGNIZING A POSITION OF AN OBJECT

This is a Continuation-In-Part of U.S. patent application Ser. No. 08/283,170 filed Aug. 3, 1994.

BACKGROUND OF THE INVENTION

The present invention relates to a method of position recognition for use in automatization of assembling processes and the like in factories.

In the assembling processes in recent years, assembling robots have been employed to do assembling work through steps of recognizing positions of components to be assembled by a visual recognition apparatus and correcting their positions and attitudes. For example, at a component supply unit such as a tray, the assembling robot first recognizes and grips positions and attitudes of components to be assembled, and rotates and corrects their attitudes to achieve the assembly. Robots for screwing work carry out the work by gripping a screw, recognizing the position of the tapped hole, and correcting the position.

Various methods are available for the above-described position recognition. A prior art example of the method for position recognition is described with reference to FIGS. 8A–8B.

The prior art example is such that an image picked from an object by an image pickup device is scanned with a template pattern, and the template pattern is overlapped on the image of the object so that the position of the object is recognized. Referring to FIGS. 8A–8B, reference numeral 102 denotes an image surface picked up by the image pickup device, and 101 denotes an image of the object within the image surface. Reference numeral 103 denotes the template pattern having the same shape as that of the image of the object.

For recognition of the position of the image 101 of the object, while the template pattern 103 is moved little by little to scan the image surface 102 on which the image 101 of the object is present, product-sum operation of the template pattern 103 and the image surface 102 is performed so that gray-level correlation values are calculated. Thus, a position where the gray-level correlation value becomes a maximum is detected, and the detected position is recognized as the position of the object.

In the above-described prior art example, if the object is maintained in the same direction at all times, one template pattern 103 will do for recognition of the position of the object. However, if the object rotates or holds a different attitude such that the positional relationship between the image pickup device and the object is changed and therefore the object becomes different in the way how it is viewed from the image pickup device, it is necessary to previously prepare a plurality of template patterns 103 matching the different ways how the object is viewed, where if one template pattern 103 cannot serve to obtain gray-level correlation values more than a certain level, scanning would need to be repeated with the template pattern 103 replaced by another until the maximum gray-level correlation value is obtained. This would result in an excess of practicable processing time, which is a problem.

Also, when an image of the object is picked up by reflective illumination, variation in the positional relationship between the reflective normal line from the object and the optical axis of the image pickup device would cause the object to be brightened or darkened. As a result, if the illumination cannot be maintained in a constant direction, it becomes difficult to recognize the position of the object by the maximum gray-level correlation value, as another problem.

SUMMARY OF THE INVENTION

An object of the present invention is to provide a method for position recognition which allows the position of an object to be recognized with one template pattern even if the object is rotating.

In accomplishing these and other objects, according to one aspect of the present invention, there is provided a computer implemented method of recognizing a position of an object, comprising the steps of:

picking up an image of an object having a circular arc shape as at least part of its profile, by an image pickup device;

converting image information of the picked-up image into gray image data and storing the gray image data in a storage device;

scanning the stored gray image with a profile scanning window composed of a plurality of gray-level detection areas crossing an imaginary scanning circular profile corresponding to the circular arc shape on the gray image and arranged circularly along the imaginary scanning circular profile and using it to measure a gray-level representative value of an inner-side gray-level detection area and a gray-level representative value of an outer-side gray-level detection area which are inside and outside of the scanning circular profile;

calculating, at each scanning position during scanning and for each gray-level detection area, an absolute value of a difference between the measured gray-level representative value of the inner-side gray-level detection area and the measured gray-level representative value of the outer-side gray-level detection area;

determining a number of gray-level detection areas in which the absolute value of the difference is larger than a specified gray-level threshold value;

detecting a position of the profile scanning window where the calculated number of gray-level detection areas becomes a maximum with respect to their neighborhood, as a position of the circular arc shape of the object; and recognizing a position of the object from the detected position of the circular arc shape thereof.

According to another aspect of the present invention, there is provided a computer implemented method of recognizing a position of an object, comprising the steps of:

picking up an image of an object having a circular arc shape as at least part of its profile, by an image pickup device;

converting image information of the picked-up image into gray image data and storing the gray image data in a storage device;

scanning the stored gray image with a profile scanning window composed of a plurality of gray-level detection areas crossing an imaginary scanning circular profile corresponding to the circular arc shape on the gray image and arranged circularly along the imaginary scanning circular profile and using it to measure a gray-level representative value of an inner-side gray-level detection area and a gray-level representative value of an outer-side gray-level detection area which are inside and outside of the scanning circular profile;

calculating, at each scanning position during scanning and for each gray-level detection area, an absolute value of a difference between the measured gray-level representative value of the inner-side gray-level detection area and the measured gray-level representative value of the outer-side gray-level detection area;

summing up the absolute values of all of the gray-level detection areas;

detecting a position of the profile scanning window where the summed absolute values of all of the gray-level detection areas becomes a maximum with respect to their neighborhood, as a position of the circular arc shape of the object; and recognizing a position of the object from the detected position of the circular arc shape thereof.

BRIEF DESCRIPTION OF THE DRAWINGS

These and other objects and features of the present invention will become clear from the following description taken in conjunction with the preferred embodiments thereof with reference to the accompanying drawings, in which:

FIG. 3 is a flowchart showing the operation of the method for position recognition according to the first embodiment of the present invention;

DETAILED DESCRIPTION OF THE PREFERRED EMBODIMENTS

Figure 1A:
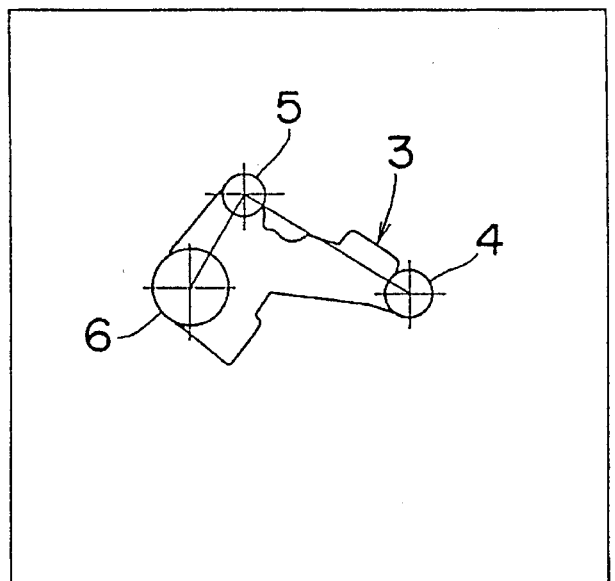
FIGS. 1A–1B together are a view showing an object and its image for the method of position recognition according to a first embodiment of the present invention.

Before the description of the present invention proceeds, it is to be noted that like parts are designated by like reference numerals throughout the accompanying drawings.

A method for position recognition according to a first embodiment of the present invention is described with reference to FIGS. 1A through 4B.

Figure 1B:
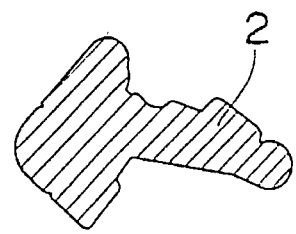

FIGS. 1A–1B show an object of the present embodiment and a gray image of the object. An image of the object 2 is picked up by an image pickup device so that the gray image 1 is obtained. Element 3 is an object image 3, which has a first circular arc 4, a second circular arc 5, and a third circular arc 6 present on the profile of the object 2.

Figure 2:
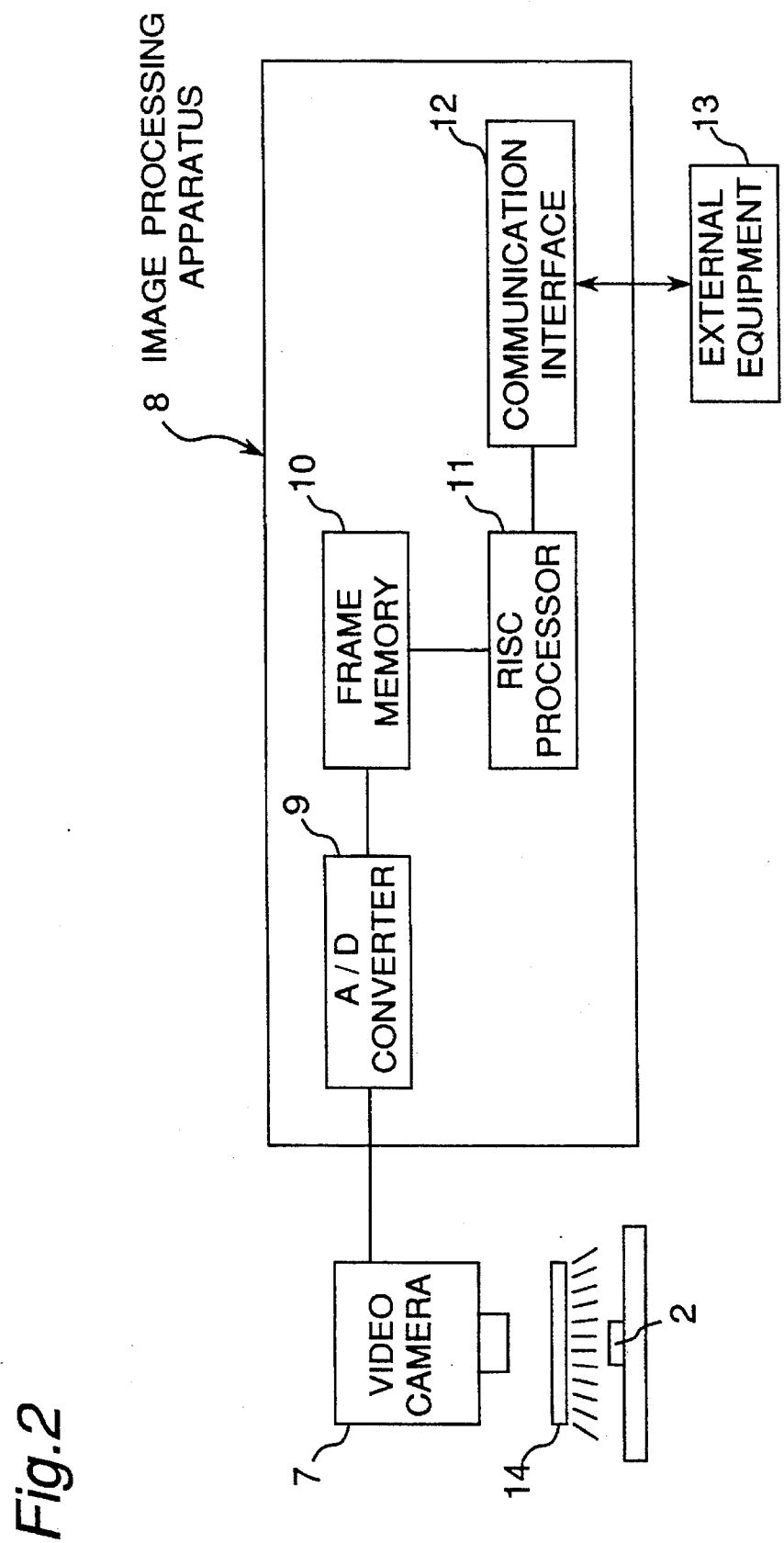
FIG. 2 is a block diagram of a position recognition apparatus to which the method of position recognition according to the first embodiment of the present invention is applied.

FIG. 2 is a block diagram of a position recognition apparatus to which the present embodiment is applied. An image processing apparatus 8 for implementing position recognition through image processing comprises a video camera 7, which is the image pickup device. An image of the object 2 illuminated with a reflective illumination device 14 is picked up by the video camera 7, and an image signal of the picked-up image is converted into digital image data through sampling and quantization processes by an A/D (analog-to-digital) converter 9, so that the digital image data is accumulated by a frame memory 10. The image data accumulated in the frame memory 10 is accessed by a RISC processor 11, which executes a position recognition program. A communication interface 12 transfers results of position recognition to external equipment 13 consisting of a robot controller or a sequencer or the like.

FIG. 3 is a flowchart of the position recognition program for the object 2, which is to be executed by the image processing apparatus 8. By the program, after picking up the image of the object 2 at step #1, centers of the first circular arc 4, the second circular arc 5, and the third circular arc 6 are detected at steps #2–4, where a determination is made as to whether or not the center-to-center distances among the circular arcs are correct at step #5. If the centers are not correct, it is determined that no object is present at step #8. If they are correct, the gripping point and direction of a screw to be screwed are calculated at step #6, and the coordinates of the gripping point and angle of the direction of the screw are outputted at step #7.

Figure 4A:
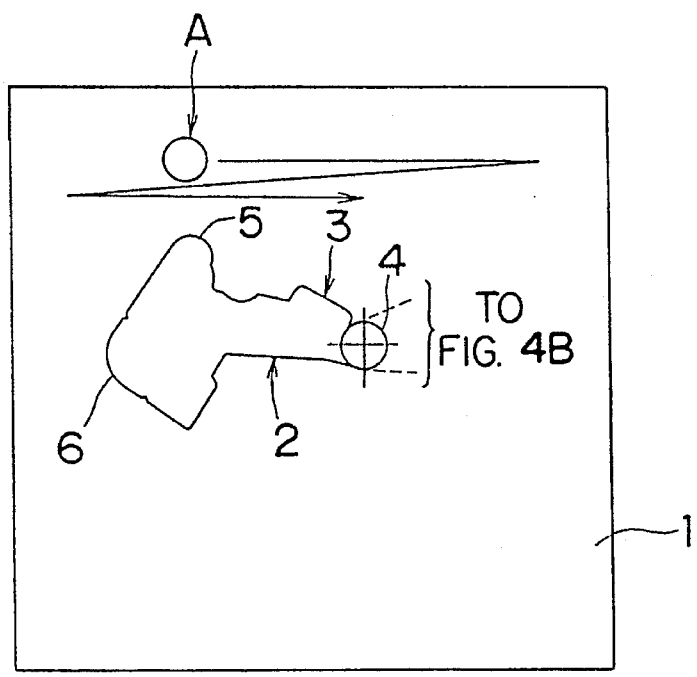
FIGS. 4A–4B together are a view showing the operation of the method for position recognition according to the first embodiment of the present invention.
Figure 4B:
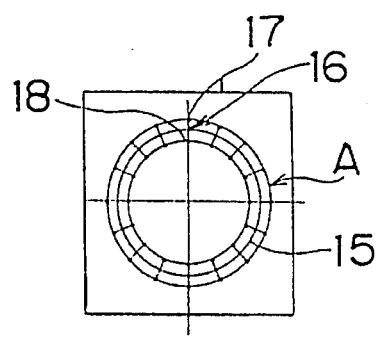

FIGS. 4A–4B show a method of detecting the position of the circular arc of the present embodiment. An imaginary circular profile scanning window A has a scanning circular profile 15 equal in diameter to the first circular arc 4 of the object image 3, a plurality of gray-level correlation lines 16 orthogonally crossing the scanning circular profile 15, an outer-side gray-level measuring portion C for detecting an image gray level of outside of the scanning circular profile 15 of each gray-level correlation line 16, and an inner-side gray-level measuring portion for detecting image gray level inside of the scanning circular profile 15 of each gray-level correlation line 16.

Figure 11:
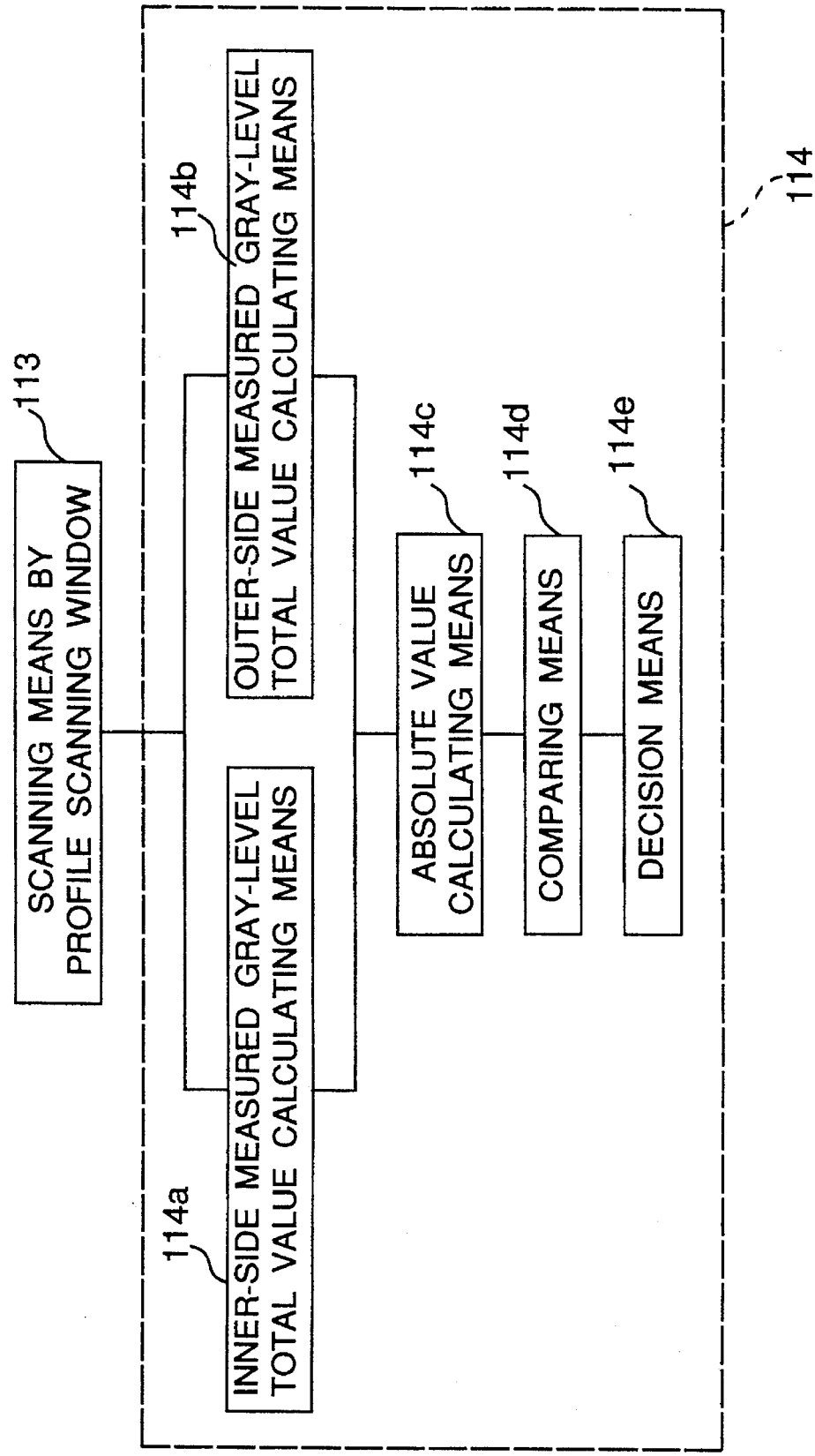
FIG. 11 is a block diagram showing the arrangement of a RISC processor in the apparatus of the position recognition which employs the method for position recognition of the first embodiment of the present invention.

FIG. 11 is a block diagram showing the main part of an apparatus for position recognition which employs the method for position recognition of the embodiment of the present invention.

Referring to FIG. 11, in the present embodiment, the RISC processor 11 for performing the position recognition comprises a scanning device 113, and a position calculation means 114. The image pickup device 7, such as a video camera, picks up an image of the first circular arc 4, and outputs an image signal. The frame memory 10 stores the image signal as it is converted into gray image data by the A/D converter 9. The scanning device 113 scans the gray image data by utilizing the profile scanning window A. The position calculation means 114 calculates the position of the first circular arc 4 by using the scanning data. The position calculation means 114 includes an inner-side measured gray-level total value calculating means 114a, an outer-side measured gray-level total value calculating means 114b, an absolute value calculating means 114c, a comparing means 114d, and a decision means 114e. The inner-side measured gray-level total value calculating means 114a calculates a total of image gray levels measured at a specified number of inner-side image gray-level measuring points constituting an entire inner-side gray-level detection area to determine an inner-side measured gray-level total value as one example of an inner-side gray level representative value. The outer-side measured gray-level total value calculating means 114b calculates a total of image densities measured at a specified number of outer-side image gray-level measuring points constituting an entire outer-side gray-level detection area to determine an outer-side measured gray-level total value as one example of an outer-side gray level representative value. The specified numbers of the inner-side and outer-side image gray-level measuring points are the same. The absolute value calculating means 114c calculates an absolute value of difference between the measured gray-level total value of the inner-side gray-level detection area and the measured gray-level total value of the outer-side gray-level detection area. The comparing means 114d compares the calculated absolute value with a later-described specified gray-level threshold value has been calculated to be less than a specified number. The decision means 114e decides based on the comparison result of the comparing means 114d whether or not the absolute value is greater than the specified gray-level threshold value. After a decision is made, the result is outputted to the communication interface 12.

Figure 12:
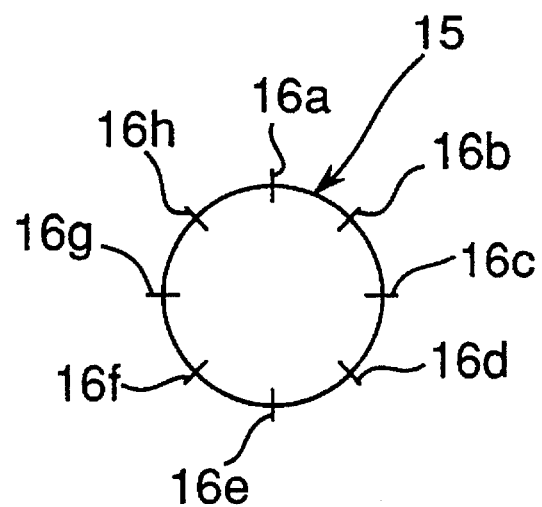
FIG. 12 is a view showing the arrangement of the profile scanning window used in the first embodiment of the present invention.

FIG. 12 shows the profile scanning window A used in the present embodiment as shown in FIGS. 4A–4B, where numeral 15 denotes the scanning circular profile having a diameter equal to that of the image of the first circular arc 4, the scanning circular profile corresponding to the boundary between the image portion and the background portion in the image of the first circular arc 4. Reference numerals 16a to 16h denote a plurality of detection areas to detect a difference between inner-side and outer-side gray level representative values, for example, in the embodiment, a plurality of gray-level correlation lines 16 (16a–16h) perpendicular to the scanning circular profile 15 and serving for measurement of gray-levels of images inside and outside of the scanning circular profile 15.

Figure 13:
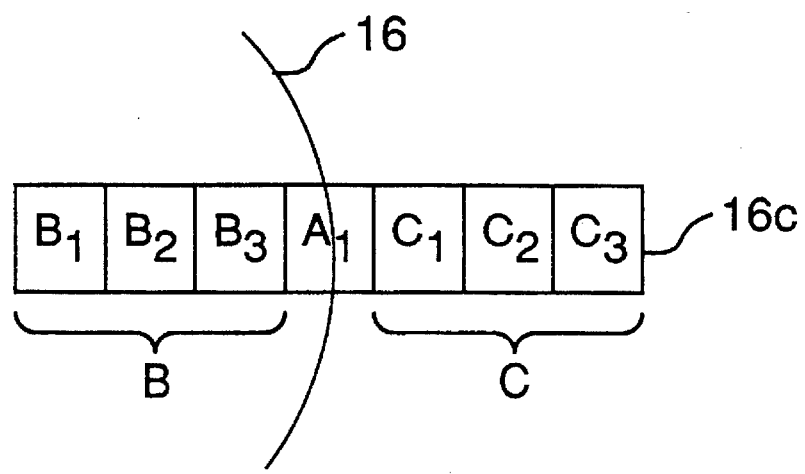
FIG. 13 is a partly detailed view of the profile scanning window of FIG. 12.

FIG. 13 shows the details of the line 16c out of the gray-level correlation lines 16a to 16h of the profile scanning window A used in the present embodiment. In the details of the line 16c, $A_1$ denotes the profile scanning position of the gray-level correlation line 16c; $B_1$, $B_2$, and $B_3$ are a specified number of, i.e., three inner-side image gray-level measuring points constituting an inner-side gray-level detection area B; $C_1$, $C_2$, and $C_3$ are a specified number of, i.e., three outer-side image gray-level measuring points constituting an outer-side gray-level detection area C.

Figure 14:
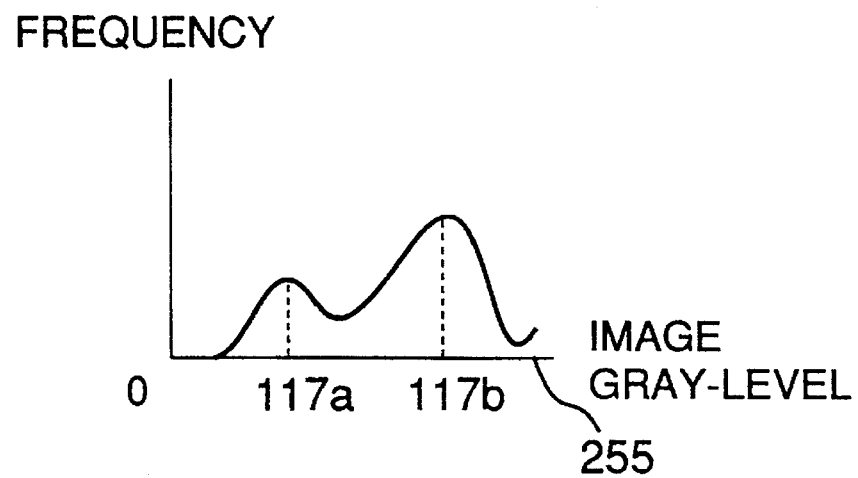
FIG. 14 is a view showing the references for determining the specified gray-level threshold value, inner-side specified total value allowable range, and outer-side specified total value allowable range of the first embodiment.

FIG. 14 is an image gray-level histogram used in determining the specified gray-level threshold value for the absolute value of the difference in gray level between the inside and outside, and the inner- or outer-side specified total value allowable ranges, which are used in the present embodiment. In FIG. 14, the abscissa axis represents the image gray level in the range of 0 to 255, and the ordinate axis represents the gray-level value frequency. The point that shows the maximum frequency comes out at two points, 117a and 117b. In the gray image 1, the area of the background portion is usually greater than the area of the first circular arc 4, so that the minor maximum point 117a represents the inner-side image gray level and the major maximum point 117b represents the outer-side image gray level.

Accordingly, the specified gray-level threshold value for the absolute value of difference in gray level between the inside and outside is one half of the gray-level value resulting from subtracting the gray-level value 117a from the gray-level value 117b. This calculation method is experimentally led out on the basis that if the gray level sharply varied at the boundary of the image of the first circular arc 4, the specified gray-level threshold value would be greater than above, but actually the gray level will vary with a gray-level gradient. However, whether or not the specified gray-level threshold value is given by one half of the above-subtracted gray-level value may change depending on the number of image gray-level measuring points of the gray-level correlation line. The advantage of such a determination method is that even if the gray-level distribution varies due to variations in illumination or the like, a proper specified gray-level threshold value can be obtained.

Also, the outer-side specified total value allowable range may vary depending on the number of outer-side image gray-level measuring points $B_1$, $B_2$, and $B_3$. When the background image gray-level value is greater than the object image gray-level value, the gray-level value 117b of the image gray-level histogram of FIG. 14 becomes the typical value of the outer-side image gray level, so that the outer-side specified total value allowable range is determined by a function of the gray-level value 117b.

Further, the inner-side specified total value allowable range may vary depending on the number of inner-side image gray-level measuring points $C_1$, $C_2$, and $C_3$. When the object image gray-level value is greater than the background image gray-level value, the gray-level value 117b of the image gray-level histogram of FIG. 14 becomes the typical value of the inner-side image gray level, so that the inner-side specified total value allowable range is determined by a function of the gray-level value 117b.

Hereinbelow, the operation of the present embodiment is described with reference to FIGS. 1A through 4B.

First, in a first process at step #1 of FIG. 3, an image signal picked up by the video camera 7 is converted into digital image data by the A/D converter 9 and, as such, taken into the frame memory 10.

Next, in a second process at step #2, the RISC processor 11 scans the circular profile scanning window A as shown in FIGS. 4A–4B on the frame memory 10 and, moving to another scanning position, performs the following calculation. An absolute value of the difference between an outer-side image gray level measured at a point where the outer-side gray-level measuring portion of each gray-level correlation line is located, and an inner-side image gray level measured at a point where the inner-side gray-level measuring portion of the gray-level correlation line is located is calculated. Then, the number of such gray-level correlation lines 16 in which the absolute value of the difference is larger than a specified gray-level threshold value determined as a function of the difference between the image gray level of the object image portion and the image gray level of the background portion in the gray image 1 is calculated. Further, a position of the circular profile scanning window A where the resulting number of gray-level correlation lines 16 becomes a maximum with respect to its neighborhood is calculated. The resulting position of the circular profile scanning window A where the number of gray-level correlation lines 16 becomes a maximum with respect to its neighborhood gives the position of the first circular arc 4 of the object image 3.

In this case, the operation of the present embodiment for detecting the position of the circular object is described below.

Figure 15:
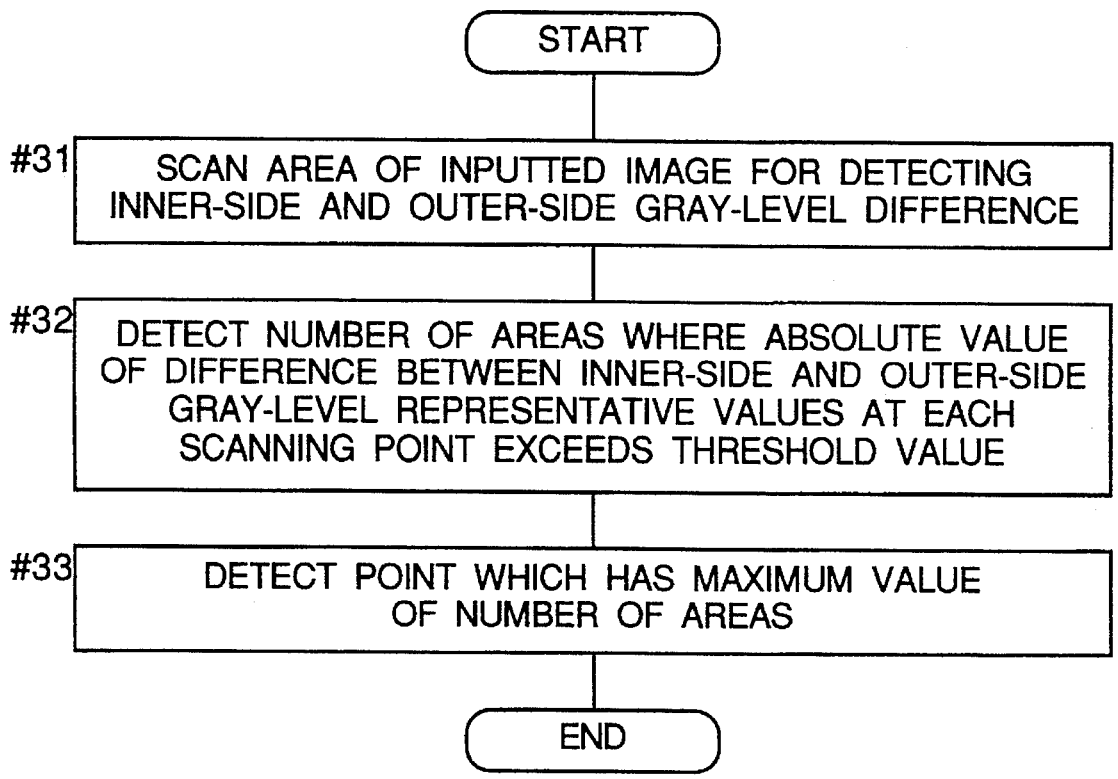
FIG. 15 is a flowchart of the method of the first embodiment.

First, at step #31 in FIG. 15, the scanning device 113 as shown in FIG. 11 begins to scan the gray image 1 shown in FIG. 4 from its left top to the right by using the profile scanning window A as shown in FIG. 4. Each time the scanning device 113 moves over one pixel, the position calculation means 114 performs the calculation at step #32 in FIG. 15.

However, if the calculation for calculating the position of the first circular arc 4 is done completely at each scanning position, the scanning time would be so long that the operation would no longer be practical. Accordingly, until the profile scanning window A approaches the position of the first circular arc 4, only a simple calculation is done to confirm that the profile scanning window A has not approached the first circular arc 4 yet and the operation moves to the next scanning point.

That is, while the profile scanning window A is largely away from the first circular arc 4, the inner- or outer-side specified total value allowable range whose determination method has been described in connection to FIG. 14 is first used. That is, in this stage, image gray level values measured at the three inner-side image gray-level measuring points $B_1$, $B_2$, and $B_3$ constituting the whole inner-side gray-level correlation line B are totaled to determine the inner-side measured gray-level total value by the inner-side measured gray-level total value calculating means 114a, where a determination is made as to whether or not the resulting total value is within the inner-side specified total value allowable range. For example, when the image gray level values measured at the three inner-side image gray-level measuring points $B_1$, $B_2$, and $B_3$ are 30, 35, and 45, the total value as the inner-side gray level representative value is 110 (=30+35+45). Also, image gray level values measured at the three outer-side image gray-level measuring points $C_1$, $C_2$, and $C_3$ constituting the whole outer-side gray-level correlation line C are totaled to determine the outer-side measured gray-level total value by the outer-side measured gray-level total value calculating means 114b, where a determination is made as to whether or not the resulting total value is within the outer-side specified total value allowable range. For example, when the image gray level values measured at the three outer-side image gray-level measuring points $C_1$, $C_2$, and $C_3$ are 120, 130, and 125, the total value as the outer-side gray level representative value is 375 (=120+130+125). Then, if either one of them is unallowable, it is determined that the profile scanning window A is still largely away from the first circular arc 4, where the calculation at the current scanning position is ended and moved to the next scanning position. In this state, the movement of the scanning position may be over a plurality of pixels instead of one pixel. Further, it may be only in either one side of the outer or inner side.

As the profile scanning window A gradually approaches the first circular arc 4, the inner-side measured gray-level total value and the outer-side measured gray-level total value come to fall within the inner-side specified total value allowable range and the outer-side specified total value allowable range, respectively. At this point, the method of calculation is changed as described below.

When the profile scanning window A is determined to have gradually approached the first circular arc 4, the specified gray-level threshold value whose determination method has been described in connection to FIG. 14 is used. That is, in this stage, at a time point when the number of such gray-level correlation lines in which the absolute value of the difference between the measured gray-level total value of the inner-side gray-level detection area B and the measured gray-level total value of the outer-side gray-level detection area C which is calculated by the absolute value calculating means 114c is greater than the specified gray-level threshold value has been calculated to be less than the specified number, the calculation at the current scanning position is halted and moved to the next scanning position. The reason that this calculation method is executed is as follows. That is, in the case where the first circular arc 4 is perfectly circular arc, the number of such gray-level correlation lines in which the absolute value of the aforementioned difference is greater than the specified gray-level threshold value equals the number of all of the lines at a time point when the profile scanning window A has substantially coincided with the first circular arc 4. Also, in the case where the first circular arc 4 lacks part of the circular shape, at a time point when the profile scanning window A has substantially coincided with the first circular arc 4, the number of lines equals to the number resulting from subtracting the number of gray-level correlation lines corresponding to the lacking part from the number of all of the lines. Therefore, if the specified number of lines is a number resulting from subtracting 1 to 2 from the number of such gray-level correlation lines in which the absolute value of the aforementioned difference is greater than the specified gray-level threshold value at the time point when the profile scanning window A has substantially coincided with the first circular arc 4, then it proves that the profile scanning window A is not coincident with the first circular arc 4 at the current scanning position at a time point when the number of such gray-level correlation lines in which the absolute value of the aforementioned difference is greater than the specified gray-level threshold value is less than the specified number of lines. As a result, the calculation at the current scanning position is halted and moved to the next scanning position. In the concrete example of the inner-side total value is 110 and the outer-side total value is 375, the absolute value of the difference between them is 265 (= |110–375 |). If the threshold value is 100, the absolute value is greater than the threshold value, the detection area is added to the number of the detection areas.

When the number of such gray-level correlation lines in which the absolute value of the aforementioned difference is greater than the specified gray-level threshold value becomes greater than the specified number of lines, the profile scanning window A has come up to close proximity to the first circular arc 4. From this point on, the regular calculation for recognizing the position of the first circular arc 4 is performed.

More specifically, the absolute value of difference between a measured gray-level total value of the inner-side gray-level detection area B composed of a specified number of inner-side image gray-level measuring points and a measured gray-level total value of the outer-side gray-level detection area C composed of a specified number of outer-side image gray-level measuring points is calculated for each gray-level correlation line. Then, a position of the profile scanning window A where the number of such gray-level correlation lines in which the absolute value is greater than the specified gray-level threshold value becomes a maximum is detected as the position of the first circular arc 4 at step #33 in FIG. 15.

Through the above steps, the position of the first circular arc 4 of the object image 3 can be recognized promptly and correctly from the test subject.

In this method, if the threshold value is determined from the image gray-level distribution in each case, correct position recognition can be achieved even if some variation of illumination is involved.

As stated before, at a position where the circular arc shaped image is clear, in general, the image gray level differs between inside and outside of the circular arc profile. Accordingly, any gray-level correlation line coincident with a position where the circular arc shaped image is clear has a large absolute value of the aforementioned difference. On the other hand, at a position where the circular arc shaped image is unclear, the image gray level inside and outside of the circular arc profile are approximately equal. Accordingly, any gray-level correlation line coincident with a position where the circular arc shaped image is unclear has a small absolute value of the aforementioned difference. Therefore, if a specified gray-level threshold value is set as described above, such a gray-level correlation line in which the absolute value of the difference is larger than the specified gray-level threshold value can be determined to be coincident with a position where the circular arc shaped image is clear. When the circular profile scanning window is perfectly coincident with the circular arc shaped image, the number of such gray-level correlation in which that the absolute value of the difference is larger than the specified gray-level threshold value becomes a maximum relative to its neighborhood. As a result, the number of such gray-level correlation lines in which the absolute value of the difference is larger than the specified gray-level threshold value is determined, and a position of the circular profile scanning window where the resulting number of such gray-level correlation lines becomes a maximum with respect to its neighborhood is detected as the position of the circular arc shape and its center position can be calculated. This decision is not related to such gray-level correlation lines, which are coincident with positions where the circular arc shaped image profile is unclear, that the absolute value of the difference is equal to or smaller than the specified gray-level threshold value. Thus, any errors due to non-circular portions or unclear portions can be prevented from occurring. Further, even if the image gray level is reversed between inside and outside depending on whether the image is positive or negative, the position detection can be achieved likewise.

Next, in a third process at step #3, the position of the center of the second circular arc 5 of FIG. 1 is detected. Since the diameter of the second circular arc 5 is equal to that of the first circular arc 4, scanning and detection are performed with the same circular profile scanning window A as used in the preceding second process at step #2. From the shape of the object image 3, the number of such gray-level correlation lines in which the absolute value of the aforementioned difference is larger than the specified gray-level threshold value, the number being determined in the third process at step #3, is detected as a point having the second largest number next to that in the second process at step #2.

Next, in a fourth process at step #4, as in the above-described process, the position of the center of the third circular arc 6 is calculated by using the circular profile scanning window A having a diameter equal to that of the image of the third circular arc 6.

Next, in a fifth process at step #5, if center-to-center distances among the center of the first circular arc 4, the center of the second circular arc 5, and the center of the third circular arc 6 are within an allowable range for a previously set reference value, then the object is identified as an object to be recognized. If not, a conclusion that no object is present is derived, in the eighth process at step #8.

When the object is a correct one, the program goes to a sixth process at step #6, where the position and direction of a gripping point which is in a certain positional relationship and direction to the aforementioned three center positions are calculated. Then, in a seventh process at step #7, coordinates of the gripping point and its angle are outputted to the external equipment 13.

According to the above-described method of the present embodiment, even if the object 2 is rotationally shifted, the circular arc shape will not vary, so that any circular arc of the same diameter can be scanned with one circular profile scanning window A. Thus, the position of the object 2 can be recognized promptly.

Further, even if the object 2 becomes lighter or darker against the background due to subtle change in the positional relationship among the reflective illumination device 14, the video camera 7, and the object 2, only a difference in gray level, if existing in the profile of the circular arc, allows the position of the object 2 to be detected, so that a recognition less affected by variation in the illumination conditions can be achieved.

Also, the circular arcs can be ranked in such a way that the larger the number of such gray-level correlation lines in which the absolute value of the difference in gray level is larger than the specified gray-level threshold value is, the higher the circular arc is ranked in proximity to a perfect circle. Thus, even if a plurality of circular arcs equal in diameter are involved, they can be discriminated from one another, as a unique advantage of the present embodiment of the present invention.

In the present embodiment, it has been arranged that an absolute value of the difference between an inner-side measured gray-level total value of the inner-side gray-levels of each detection area and an outer-side measured gray-level total value of an outer-side gray-level measuring portion of each gray-level correlation line is calculated, and the number of such gray-level correlation lines in which the absolute value of the difference is larger than a specified gray-level threshold value is determined, and further a position of the circular profile scanning window where the number of such gray-level correlation lines becomes a maximum with respect to its neighborhood is detected as the position of the circular arc shape. However, it may also be arranged such that a position of the circular profile scanning window where not the absolute value of the difference with respect to one gray-level correlation line, but the sum of absolute values of the difference with respect to all of the gray-level correlation lines becomes a maximum with respect to its neighborhood is detected as the position of the circular arc shape, which is effective when there is clear contrast between the inner-side and outer-side gray-level detection areas. In this method, when the number of gray-level correlation lines is small, the detection sensitivity is better than that with the number of such gray-level correlation lines in which the absolute value of the difference is larger than a specified gray-level threshold value.

Also, in the present embodiment, it may also be arranged such that measured gray levels of the outer-side gray-level measuring portion C and the inner-side gray-level measuring portion B are provided each by an average value of gray levels of their neighbor pixels, as a countermeasure for noise. In this case, the spacing between the outer-side gray-level measuring portion C and the inner-side gray-level measuring portion B may be changed or the number of measuring points may be changed so that the sensitivity can be controlled.

In the first embodiment, the diameters of the first, second, and third circular arcs 4, 5, and 6 are different from each other, three kinds of profile scanning windows A having the diameters corresponding to the arcs are used.

A method for position recognition according to a second embodiment of the present invention is described with reference to FIG. 5. The method for position recognition according to the second embodiment can be suitably applied to a screw hole position recognition for a screwing operation.

Figure 5:
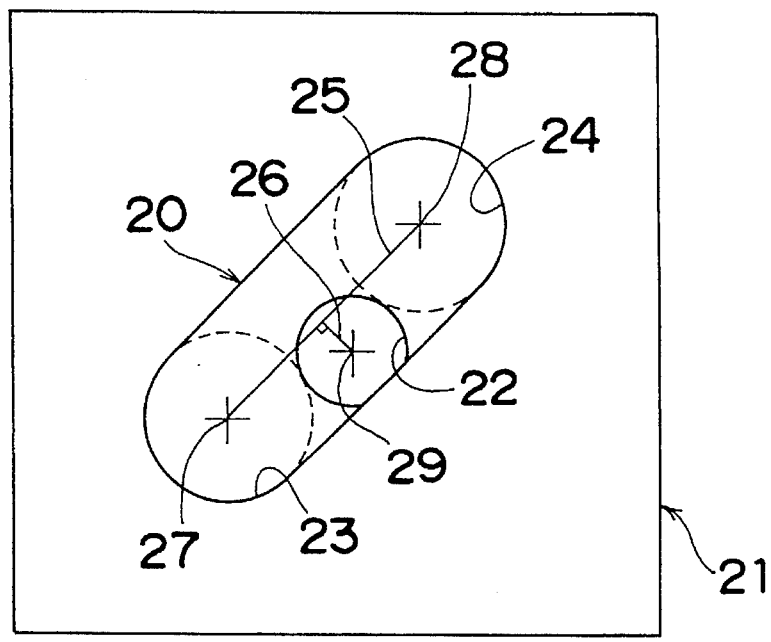
FIG. 5 is a view showing the operation of the method for position recognition according to a second embodiment of the present invention.

In FIG. 5 there are shown a slot 20 provided to an upper member for use of screwing, a gray image 21 obtained by picking up an image of the slot 20 by the video camera 7, a lower hole 22 provided to a lower member for use of screwing, a first slot circular arc 23 forming one end of the slot 20, a second slot circular arc 24 forming the other end of the slot 20, a line segment 25 connecting centers 27 and 28 of the first and second slot circular arcs 23 and 24, and a distance 26 between a center 29 of the lower hole 22 and the line segment 25.

Figure 9:
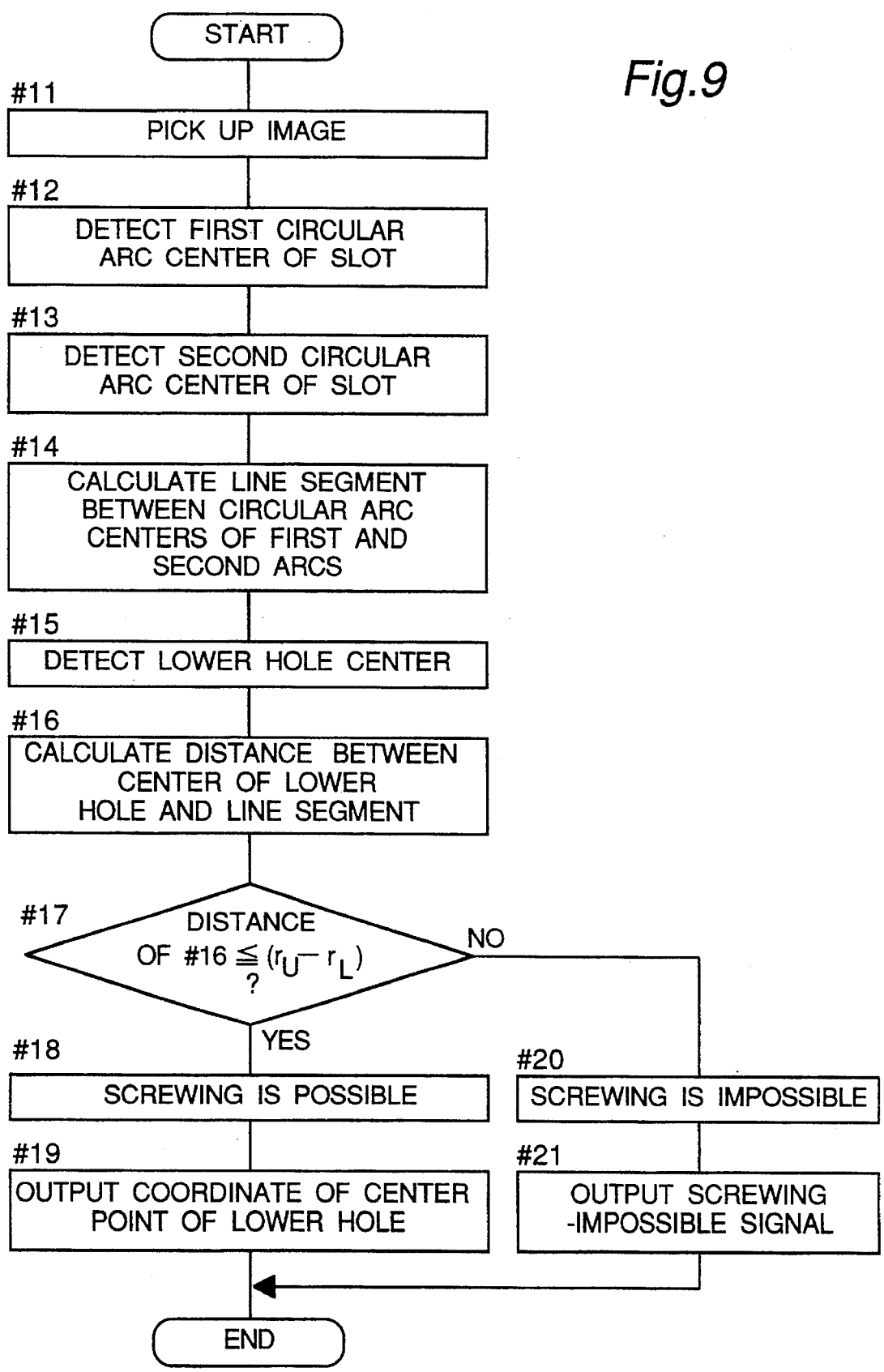
FIG. 9 is a flowchart showing an operation when the method of the second embodiment is applied to the screw hole position recognition.

The detailed operation when the method of the second embodiment is applied to the screw hole position recognition is described below referring to FIG. 9.

At step #11, the image of the object is picked up as described in the first embodiment. At steps #12 and #13, the position recognition of the centers 27 and 28 of the first and second elongated hole circular arcs 23 and 24 are performed as described in the second process at step #2 of the first embodiment. At step #14, the line segment 25 which connects the centers 27 and 28 is calculated based on the recognized positions of the centers 27 and 28. At step #15, the position recognition of the center 29 of the lower hole 22 is performed similarly to the step #12. At step #16, the distance 26 between the center 29 of the lower hole 22 and the line segment 25 is calculated based on the recognized position of the center 29 of the lower hole 22 and the above-calculated line segment 25. At step #17, a determination is made as to whether or not the calculated distance 26 is greater than $(r_U-r_L)$ wherein $r_U$ is the radius of each of the first and second elongated hole circular arcs 23 and 24 when the arcs 23 and 24 are equal to each other and $r_L$ is a radius of the lower hole 22. If it is determined that the calculated distance 26 is greater than $(r_U-r_L)$ at step #17, this means that the screwing operation is possible at step #18, and then the output signal for screwing which includes the coordinate of the center 29 of the lower hole 22 is outputted. This coordinate of the center 29 of the lower hole 22 is used as a center of a screw at the screwing operation. If it is determined that the calculated distance 26 is not greater than $(r_U-r_L)$ at step #17, this means that the screwing operation is impossible at step #20. Then, a signal indicating that a screwing operation cannot be carried out is outputted at step #21.

In the second embodiment, the centers 27 and 28 of the first and second slot circular arcs 23 and 24, respectively, are detected from the gray image 21 by scanning with one circular profile scanning window at steps #12 and #13, in the same way as in the first embodiment. The center 29 of the lower hole 22 is also detected from the gray image 21 by scanning with another circular profile scanning window at step #15, in the same way as in the first embodiment. The line segment 25 is determined from these centers 27 and 28 at step #4, so that the position and direction of the slot 20 can be recognized by the line segment 25.

Further, if the length of the distance 26 between the line segment 25 and the center 29 of the lower hole 22 is within an allowable range at steps #16 and #17, the position of the center 29 of the lower hole 22 is outputted to the external equipment 13 so that the screwing is targeted to the center 29 of the lower hole 22. In this case, the allowable range is set to a maximum length of the distance 26 in such a state that the lower hole 22 can be seen over its whole profile without being hidden under the slot 20. For example, supposing that the radius of the first and second elongated hole circular arcs 23 and 24 is 2 mm, the line segment 25 is 6 mm, and the radius of the lower hole 22 is 1.6 mm, the allowable range of the distance 26 is 0.4 mm.

Thus, since screwing is possible only when the lower hole 22 can be seen over its whole profile without being hidden under the slot 20, there can be eliminated a possibility of misscrewing as a result of screwing forcedly effected when part of the lower hole 22 is hidden under the slot 20, in which case the screw may hit against the upper member and be thereby tilted. Accordingly, screwing work can be carried out with improved reliability.

A method for position recognition according to a third embodiment of the present invention is described with reference to FIG. 6.

Figure 6:
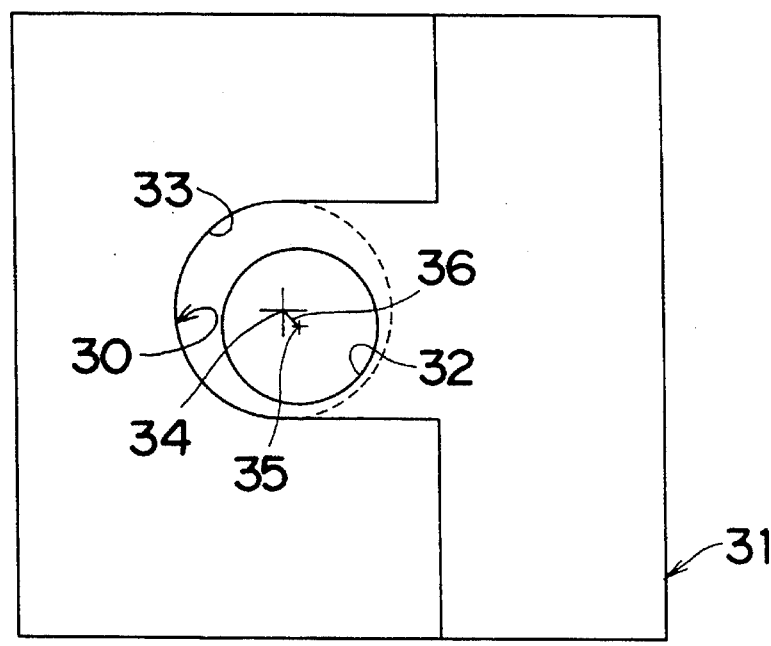
FIG. 6 is a view showing the operation of the method for position recognition according to a third embodiment of the present invention.

In FIG. 6, there are shown an open hole 30 for screwing provided to an upper member which is a cutout where part of the edge of the hole is cut out, a gray image 31 obtained by picking up an image of the open hole 30 by the video camera 7, a lower hole 32 for screwing provided to a lower member, a circular arc 33 forming the open hole 30, a center 34 of the circular arc 33, a center 35 of the hole 32, and a distance 36 between the center 34 and the center 35.

Positions of the circular arc 33 and the center 34 are determined in the same way as in the first embodiment. Positions of the lower hole 32 and the center 35 are also determined in the same way as in the first embodiment. The distance 36 can be determined from the positions of the center 34 and the center 35.

If the length of the distance 36 is within an allowable range, the position of the center 35 of the lower hole 32 is outputted to the external equipment 13 so that the screwing is targeted to the center 35 of the lower hole 32. In this case, the allowable range is set to a maximum length of the distance 36 in such a state that the lower hole 32 can be seen over its whole profile without being hidden under the open hole 30.

Thus, since screwing is possible only when the lower hole 32 can be seen over its whole profile without being hidden under the open hole 30, there can be eliminated a possibility of misscrewing as a result of screwing forcedly effected when part of the lower hole 32 is hidden under the open hole 30 in which case the screw may hit against the upper member and be thereby tilted. Accordingly, screwing work can be carried out with improved reliability.

A method for position recognition according to a fourth embodiment of the present invention is described with reference to FIGS. 7A–7C.

Figure 7A:
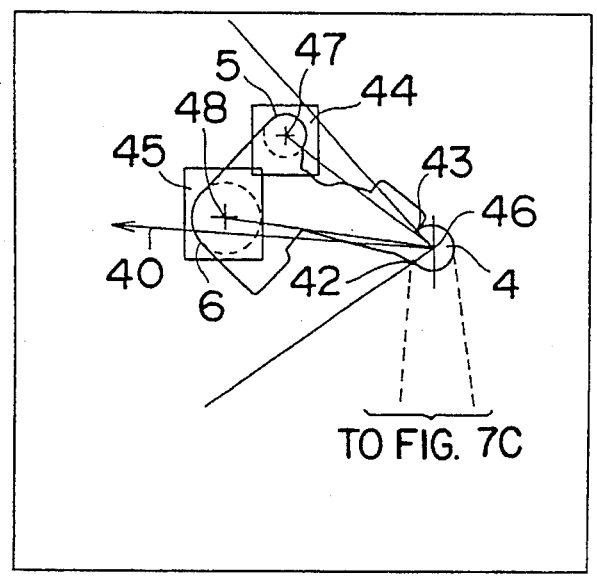
FIGS. 7A–7C together are a view showing the operation of the method for position recognition according to a fourth embodiment of the present invention.
Figure 7B:
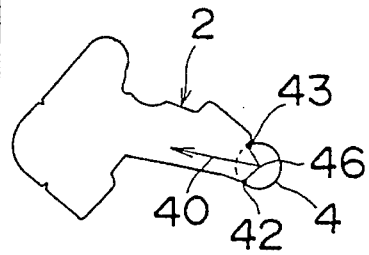
Figure 7C:
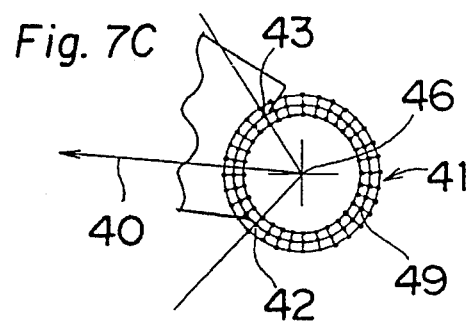
Figure 8A:
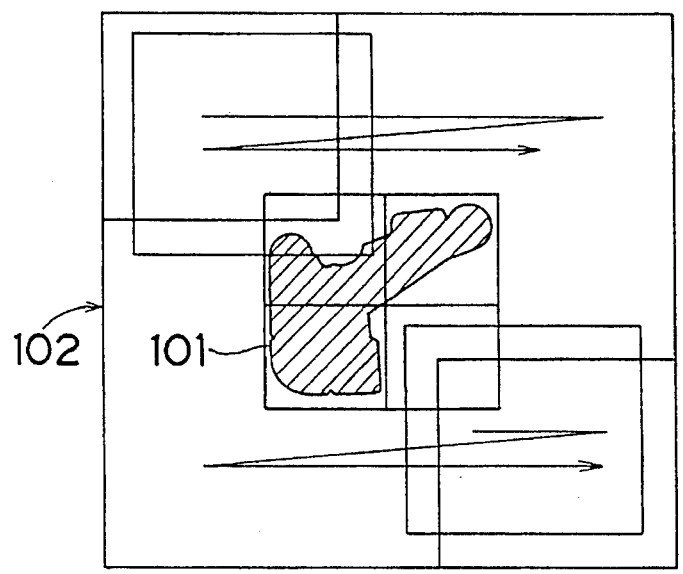
FIGS. 8A–8B together are a view showing the operation of a prior art example.
Figure 8B:
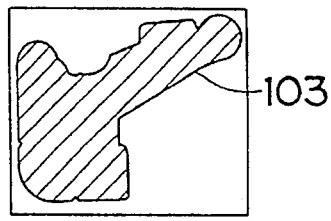

In FIGS. 7A–7C, there are shown an object 2, a first circular arc 4 forming a part of the profile of the object 2, an opening direction 40 of the first circular arc 4, a circular profile scanning window 41 for scanning the first circular arc 4, an end point 42 where a sequence of such gray-level correlation lines in which the absolute value of difference between an inner-side measured gray-level total value and an outer-side measured gray-level total value is larger than a specified gray-level threshold value ceases continuing, and another end point 43 where the sequence of such gray-level correlation lines ceases continuing. Further shown in FIGS. 7A–7C are a second circular arc 5 forming a part of the profile of the object 2, a third circular arc 6 forming a part of the profile of the object 2, a first detection area 44 of the second circular arc 5 which depends on the position of the first circular arc 4 and its opening direction 40, and a second detection area 45 of the third circular arc 6 which depends on the position of the first circular arc 4 and its opening direction 40.

In the fourth embodiment, when the number of such gray-level correlation lines in which the absolute value of difference between an inner-side measured gray-level total value and an outer-side measured gray-level total value is larger than a specified gray-level threshold value becomes a maximum with respect to their neighborhood so that the circular profile scanning window 41 for scanning the first circular arc 4 is coincident with the first circular arc 4, the end points 42 and 43 become end points where the difference in gray level between the inside and outside of the first circular arc 4 becomes zero on the profile of the first circular arc 4. A line bisecting an angle formed by two lines connecting the end points 42 and 43, respectively, with a center 46 of the first circular arc 4 is determined as the opening direction 40 of the first circular arc 4. Only the center 46 and opening direction 40 of the first circular arc 4 allow the position and approximated direction of the object 2 to be recognized. However, the opening direction 40 is dependent in its resolution on the number of gray-level correlation lines 49. Therefore, in order to determine an even more accurate direction, when the second circular arc 5 is present in the first detection area 44 in a relative positional relationship with respect to the detected center 46 and opening direction 40 of the first circular arc 4, scanning the second circular arc 5 within the first detection area 44 allows the position of the second circular arc 5 to be detected simply and promptly. Similarly, the position of the third circular arc 6 can also be detected simply and promptly within the second detection area 45. Further, from the relationship between a vector directed from the center 46 of the first circular arc 4 toward a center 47 of the second circular arc 5 and another vector directed from the center 46 of the first circular arc 4 toward a center 48 of the third circular arc 6, a determination can be made as to whether the object 2 is faced up or down.

Figure 10:
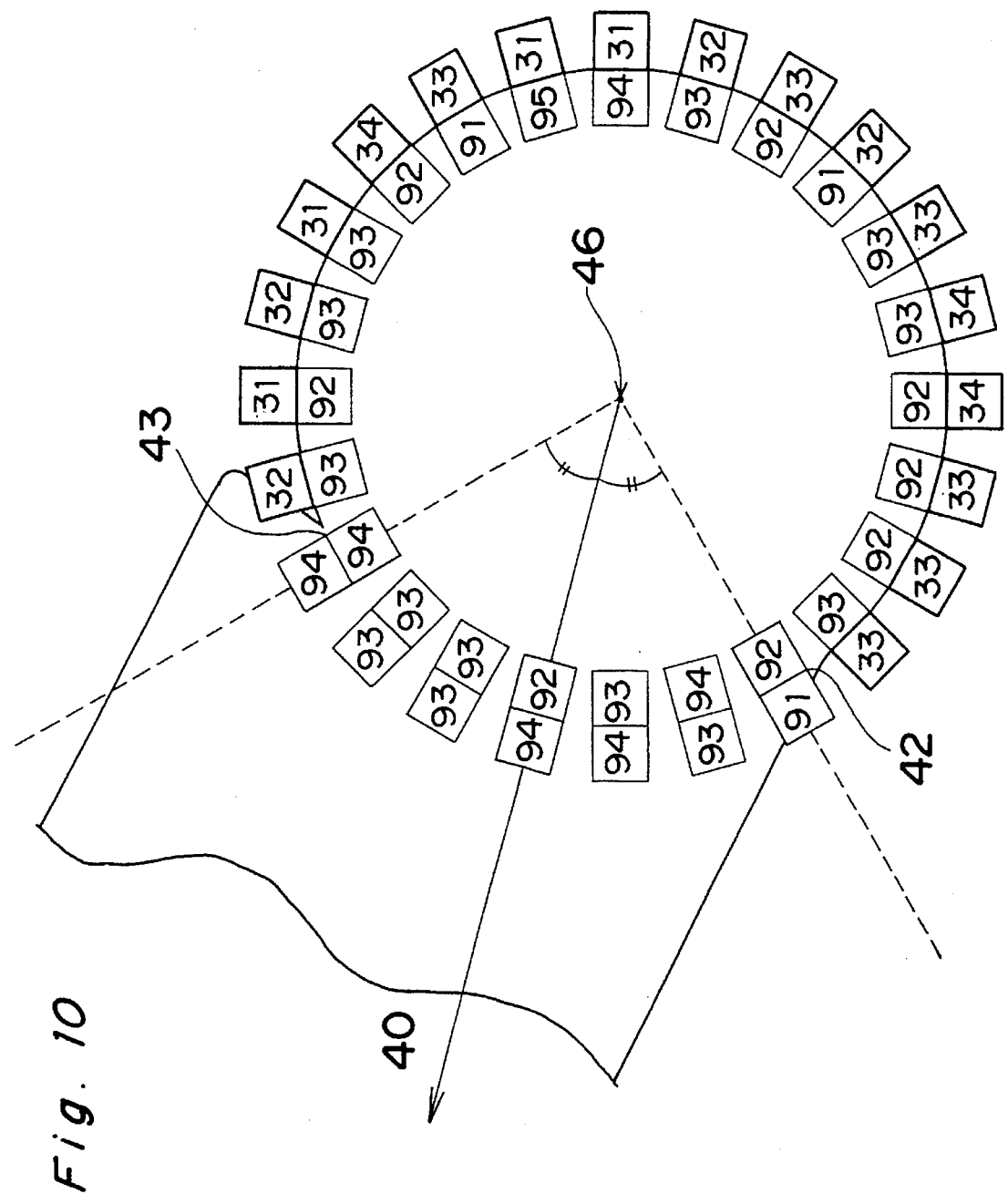
FIG. 10 is a view showing an example of the fourth embodiment which shows a metallic component put on a black tray.

FIG. 10 shows an example of the fourth embodiment which shows a metallic component put on a black tray. In FIG. 10, supposing that 24-gray-level correlation lines are used, and a specified gray-level threshold value is any value of 10–25, each gray level as an inner-side gray level representative value or an outer-side gray level representative value is shown by a number having a value of 0–255 in each square of an inner-side measured gray-level total value or an outer-side measured gray-level total value. Then, the absolute values of the difference between inner-side measured gray-level total values and outer-side measured gray-level total values are respectively 1 and 0 at the end points 42 and 43. A region from the end point 42 to the end point 43 is a region where the absolute value of difference between an inner-side measured gray-level total value and an outer-side measured gray-level total value is not larger than the specified gray-level threshold value, that is, there is not a significant difference in gray levels between the inside and outside of the correlation lines.

In the above-described embodiments, the first, second, and third circular arcs 4, 5, and 6 have been employed. However, the second and third circular arcs 5, 6 are not limited to circular arcs but may also be of another shape for position recognition.

Now other embodiments of the present invention are described below.

Figure 16:
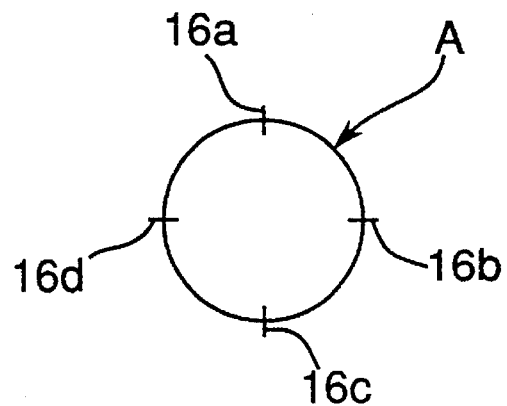
FIG. 16 is a view showing the arrangement of the profile scanning window used in another embodiment of the present invention.

FIG. 16 shows the arrangement of the profile scanning window A used in the another embodiment. The gray-level correlation lines are the four lines of 16a, 16b, 16c, and 16d spaced at intervals of 90°. The way in which they are used is the same as in the first embodiment, and the description thereof has been omitted.

When the object of the position recognition is a circular object entire whole circumference is invariably clear, a profile scanning window A having such a small number of gray-level correlation lines may be used. As a result, correct, prompt position recognition can be accomplished with a higher-speed calculation.

Although in the embodiment, the size and configuration of the scanning profile have the same as those of the profile of the object, the size and/or configuration of the scanning profile can be different from the size and/or configuration of the object.

Moreover, although the profile scanning window is used in the disclosed embodiments, only detection areas can be used as the window without the profile.

Furthermore, although the detection area is a correlation line in the disclosed embodiments, the detection area is not limited to a line and can be of an arbitrary shape capable of detecting inner-side and outer-side gray level representative values.

It is noted that the specified number of gray-level measuring points of the inner-side gray-level detection area B and the outer-side gray-level detection area C of a gray-level correlation line may be set to an arbitrary number equal to or more than 1. When the specified number of gray-level measuring points of the inner-side gray-level detection area B and the outer-side gray-level detection area C of a gray-level correlation line are equal to 1, the calculation for finding the inner-side and outer-side measured gray-level total values can be omitted.

In other words, in the embodiments, the gray-level representative value of the inner-side gray-level detection area is a total value of a specified number of inner-side image gray-level measuring points constituting the inner-side gray-level detection area and the gray-level representative value of the outer-side gray-level detection area is a total value of the same number of outer-side image gray-level measuring points constituting the outer-side gray-level detection area as that of the inner-side image gray-level measuring points.

However, the gray-level representative value of the inner-side and outer-side gray-level detection areas are not limited to the total values. For example, the gray-level representative value of the inner-side gray-level detection area can be an average value of a specified number of inner-side image gray-level measuring points constituting the inner-side gray-level detection area and the gray-level representative value of the outer-side gray-level detection area can be an average value of a specified number of outer-side image gray-level measuring points constituting the outer-side gray-level detection area. That is, for example, in FIG. 13, the gray level values of the points $B_1$ and $B_2$ are totaled and divided by two in the inner-side gray-level detection area while the gray level values of the points $C_1$ and $C_2$ are totaled and divided by two in the outer-side gray-level detection area. Alternatively, the gray-level representative value of the inner-side gray-level detection area can be a value selected from inner-side image gray-level measuring points constituting the inner-side gray-level detection area and the gray-level representative value of the outer-side gray-level detection area can be a value selected from outer-side image gray-level measuring points constituting the outer-side gray-level detection area. That is, for example, in FIG. 13, the gray level value of the points $B_1$ is selected in the inner-side gray-level detection area while the gray level value of the point $C_2$ is selected in the outer-side gray-level detection area. In this case, when the profile of the object on the gray image is unclear, or when the size of the object is larger than that of the scanning profile, for example, in FIG. 13, a point $B_1$ or $C_3$ can be selected which is separated away from the point $A_1$ corresponding to the profile of the object by a few points.

Indeed, it has conventionally been possible to scan a perfect circular shape present in an image and thereby recognize its position. However, when only part of the profile of the image is shaped into a circular arc, or when part of the circular profile of the image is unclear, the prior art scanning technique with a template pattern could not prevent occurrence of errors due to non-circular portions or unclear portions of the image. As a result, it has been impossible to recognize the position and direction of an object whose profile is shaped only partly into a circular arc, by detecting the circular arc shaped portion of the image of the object.

The above embodiments of the present invention uses a circular profile scanning window which is composed of a scanning circular profile equal in diameter to a circular arc shape on a gray image on which the circular arc shape, an object of the scanning, is present, and a plurality of gray-level correlation lines, e.g. orthogonally, crossing the scanning circular profile and serving for measuring image gray levels of inside and outside the scanning circular profile. Two methods are available for scanning by this circular profile scanning window.

In one of the two methods, in the disclosed embodiments, at each scanning position during scanning and for each gray-level correlation line, what is calculated is an absolute value of difference between an inner-side measured gray-level total value resulting from measuring gray levels at positions where a specified number of inner-side image gray-level measuring points of an inner-side gray-level detection area of a gray-level correlation line are present and then summing up the measured gray levels, and an outer-side measured gray-level total value resulting from measuring gray levels at positions where the same specified number of outer-side image gray-level measuring points of an outer-side gray-level detection area of the gray-level correlation line are present and then summing up the measured gray levels.

Generally, at positions where the circular arc shaped image is clear, the image gray level differs between inside and outside of the circular arc shape. Accordingly, any gray-level correlation line coincident with a position where the circular arc shaped image is clear results in a large absolute value of the aforementioned difference. On the other hand, at positions where the circular arc shaped image is unclear, the image gray level becomes generally equal between inside and outside of the circular arc shape. Accordingly, any gray-level correlation line coincident with a position where the circular arc shaped image is unclear results in a small absolute value of the aforementioned difference.

Therefore, if a specified gray-level threshold value is set, such a gray-level correlation line in which the absolute value of the difference is larger than the specified gray-level threshold value can be determined to be coincident with a position where the circular arc shaped image is clear. When the circular profile scanning window is perfectly coincident with the circular arc shaped image, the number of such gray-level correlation lines in which the absolute value of the difference is larger than the specified gray-level threshold value becomes a maximum relative to their neighborhood. Accordingly, the number of such gray-level correlation lines in which the absolute value of the difference is larger than the specified gray-level threshold value is found, and a position of the circular profile scanning window where the resulting number of gray-level correlation lines becomes a maximum with respect to its neighborhood can be regarded as the position of the circular arc shape. This decision is not related to such gray-level correlation lines, which are coincident with positions where the circular arc shaped image profile is unclear, such that the absolute value of the difference is not larger than the specified gray-level threshold value. Thus, any errors due to non-circular portions or unclear portions can be prevented from occurring.

In the second method, at each scanning position during scanning and for each gray-level correlation line, what is calculated is an absolute value of the difference between an inner-side measured gray-level total value resulting from measuring image gray levels at positions where a specified number of inner-side image gray-level measuring points of an inner-side gray-level detection area of a gray-level correlation line are present and then summing up the measured gray levels, and an outer-side measured gray-level total value resulting from measuring image gray levels at positions where a specified number of outer-side image gray-level measuring points of an outer-side gray-level detection area of the gray-level correlation line are present and then summing up the measured gray levels. Then, the absolute values of the difference are summed up with respect to all of the gray-level correlation lines.

A position of the circular profile scanning window where the sum of the absolute values of the difference becomes a maximum with respect to its neighborhood is detected as the position of the circular arc shape.

Generally, any gray-level correlation line which is coincident with a position where the circular-arc-shaped image is clear has a large absolute value of the aforementioned difference, greatly contributing to the aforementioned sum. Any gray-level correlation line coincident with a position where the circular-arc-shaped image is unclear has a small absolute value of the aforementioned difference, having almost no relation to the sum. Accordingly, the above position detection can prevent any errors due to gray-level correlation lines coincident with positions where the circular-arc-shaped image profile is unclear, so that the second method is better in sensitivity than the first method when the entire number of gray-level correlation lines is small or when there is clear contrast between the inside and outside of the profile.

In the method for position recognition of the embodiments of the present invention, the position of a circular-arc-shaped image is detected based on the first and second methods. Therefore, when the object of the position recognition has a circular arc shape, correct position recognition of the object can be achieved irrespective of its position, direction, and attitude.

The method for position recognition according to the first embodiment of the present invention achieves position recognition by a circular arc shape of an object having the circular arc shape on part of its profile. Even if the object is rotating in position on a two-dimensional plane vertical to the optical axis of the image pickup device, position recognition can be achieved for the same circular arc shape with the same circular profile scanning window. Thus, the position of the object can be recognized from the recognized position of the circular arc shape.

The method for position recognition according to the first embodiment of the present invention recognizes positions of a plurality of circular arc shapes of an object having the plurality of circular arc shapes on its profile. Thus, the object can be identified from distances and positional relationships among the plurality of circular arc shapes. If any different type of product is mixedly involved as the object, or if any object reversed upside down is involved, these can be discriminated from others so that regular objects can be recognized in their position and direction of rotation.

The methods for position recognition according to the second and third embodiments of the present invention are capable of recognizing the position of a slot or an open hole which has been impossible to recognize by the prior art because of their shape being not perfectly circular.

The methods for position recognition according to the second and third embodiments of the present invention are capable of recognizing the position and direction of a slot or an open hole which is the upper hole for screwing and which has been impossible to recognize by the prior art because of their shape being not perfectly circular. Moreover, the methods for position recognition are also capable of recognizing the position of the lower hole and therefore deciding whether or not the positions of the upper hole, which is a slot or an open hole, and the lower hole are screwable.

The method for position recognition according to the fourth embodiment of the present invention recognizes the position of a circular arc shape of an object by the first method, and at the same time detects two end points on the scanning circular profile where a sequence of such gray-level correlation lines in which the absolute value of difference is larger than a specified gray-level threshold value ceases continuing. The opening direction in which the circular arc shape is opened is recognized from the positions of these end points, so that the direction toward which the object is directed can be recognized by the recognized opening direction.

The method for position recognition according to the fourth embodiment of the present invention recognizes the direction toward which the object is directed and thereafter limits the search range of the second position restricting point of the object based on the resulting direction of the object and further detects the position of the second position restricting point from the limited search range. As a result, the processing time can be reduced and the recognition reliability can be improved.

The method for position recognition according to the fourth embodiment of the present invention recognizes the position of a circular arc shape of an object by the first method, and at the same time recognizes the direction of a slot or the direction of an open hole from the distributed positions of such gray-level correlation lines in which the absolute value of difference is larger than a specified gray-level threshold value.

According to the method for position recognition of the embodiments of the present invention, the position of a circular arc shape of an object is recognized and, based on the recognized position of the circular arc shape, the position and direction of the object are recognized. With the use of a template pattern matching the diameter of the circular arc shape, position recognition can be achieved with the same template pattern even if the object is rotationally shifted. Thus, the method of the embodiments of the invention offers an advantage that the position and direction of an object can be recognized with simplicity and in practicable required time.

According to the method for position recognition, variations in the absolute value of the difference between inside and outside of the circular arc shaped image of an object is detected by gray-level detection areas (e.g. correlation lines) of the circular profile scanning window, so that the position of the circular arc shape is recognized. Therefore, only if some clear circular arc is present even partly, it is possible to select and recognize the present clear part, so that even with an object of a complex shape, its position and direction can be recognized promptly and correctly even if the object has rotationally shifted, as an advantage of the embodiments. Moreover, it becomes possible to recognize matching and mismatch between upper hole and lower hole as well as recognize the position and direction of a slot or an open hole in automated screwing process, which has conventionally been impossible by the prior art. Thus the method of the embodiments offers another advantage that the screwing work can be carried out with improved reliability.

Also, the method for position recognition is capable of direction recognition. Therefore, when the position and direction of an object is recognized with a plurality of position and direction checking patterns, recognizing a first position and direction checking pattern allows the positions where the other position and direction checking patterns are present to be approximately determined. Thus, the method of the embodiments also offers an advantage that the position and direction can be recognized promptly and correctly.

Furthermore, even if the direction of illumination has changed so that the object becomes lighter or darker against the background, only the presence of difference in gray level between inside and outside of the profile of the circular arc makes it possible to achieve position recognition. Thus, the method of the embodiments offer a further advantage that position recognition can be achieved without being adversely affected by any variation in illumination.

Further, according to the method for position recognition of the embodiments of the present invention, for prompted scanning of the profile scanning window, the calculation at a scanning position of the profile scanning window can be halted and moved to the next scanning position at a time point when the number of such gray-level correlation lines in which the absolute value of the difference between a measured gray-level total value of the inner-side gray-level detection area and a measured gray-level total value of the outer-side gray-level detection area calculated for each gray-level correlation line is greater than a specified gray-level threshold value has been calculated to be less than a specified number. Referring to the reason of this, the number of gray-level correlation lines enough to attain correct position recognition needs to be equal to or more than a specified number. Also, when the profile of the object is only partly circular and otherwise not, the number of such gray-level correlation lines in which the absolute value of the aforementioned difference is greater than the specified gray-level threshold value becomes a maximum at a position where the profile scanning window is completely coincident with the circular part. Accordingly, the number of gray-level correlation lines enough to attain correct position recognition needs to be more than a number slightly smaller than the number of the above maximum. Meanwhile, the calculation of the absolute value of the difference between the measured gray-level total value of the inner-side gray-level detection area and the measured gray-level total value of the outer-side gray-level detection area takes time until it is completed. Therefore, at a time point during the calculation when the number of gray-level correlation lines that can be used for position recognition has considered to be less than the specified number, the calculation can be halted and moved to the next scanning position. Thus, the scanning of the profile scanning window can be carried out promptly.

Further, according to the method for position recognition of the embodiments of the present invention, for prompted scanning of the profile scanning window, the calculation at a scanning position of the profile scanning window can be halted and moved to the next scanning position at a time point when, with the background image gray-level value greater than the object image gray-level value, the measured gray-level total value of the whole outer-side gray-level detection area has been calculated to fall outside an outer-side specified total value allowable range. Referring to the reason of this, when the profile scanning window is located close to the image of the object, the measured gray-level total value due to measurement of the whole outer-side gray-level detection area corresponds to the outer-side image gray level of the image of the object, so that the measured gray-level total value falls within the outer-side specified total value allowable range determined based on the outer-side image gray level, as a matter of course. Accordingly, if it does not fall within the outer-side specified total value allowable range, the profile scanning window is out of the image of the object. Thus, the calculation can be halted and moved to the next scanning position. This decision by the specified total value allowable range can be done promptly so that the scanning of the profile scanning window can be carried out promptly.

Also, according to the method for position recognition of the embodiments of the present invention, for prompted scanning of the profile scanning window, the calculation at a scanning position of the profile scanning window can be halted and moved to the next scanning position at a time point when, with the object image gray-level value greater than the background image gray-level value, the measured gray-level total value of the whole inner-side gray-level detection area has been calculated to fall outside an inner-side specified total value allowable range. Referring to the reason of this, when the profile scanning window is located close to the image of the object, the whole inner-side gray-level detection area corresponds to the inner-side gray level of the image of the object, so that the measured gray-level total value falls within the inner-side specified total value allowable range, as a matter of course. Accordingly, if it does not fall within the inner-side specified total value allowable range, the profile scanning window is out of the image of the object. Thus, the calculation can be halted and moved to the next scanning position. This decision by the specified total value allowable range can be done promptly so that the scanning of the profile scanning window can be carried out promptly.

Still also, according to the method for position recognition of the embodiments of the present invention, the inner-side or outer-side specified total value allowable range can be determined by referencing the gray level of a maximum point of a gray-level histogram of pixels of the gray image. Thus, the position of the object can be correctly recognized without being affected by the quantity of light of the illumination, as a further advantage.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A computer implemented method of recognizing a position of an object, comprising the steps of:

picking up an image of an object having a circular arc shape as at least part of its profile using an image pickup device;

converting image information of the picked-up image into gray image data and storing the gray image data in a storage device;

scanning the stored gray image data with a profile scanning window composed of a plurality of gray-level detection areas crossing an imaginary scanning circular profile corresponding to the circular arc shape on the gray image and arranged circularly along the imaginary scanning circular profile and using it to measure a gray-level representative value of an inner-side gray-level detection area and a gray-level representative value of an outer-side gray-level detection area which are inside and outside of the scanning circular profile;

calculating, at each scanning position during scanning and for each gray-level detection area, an absolute value of a difference between the measured gray-level representative value of the inner-side gray-level detection area and the measured gray-level representative value of the outer-side gray-level detection area;

determining a number of gray-level detection areas in which the absolute value of the difference is larger than a specified gray-level threshold value;

detecting a position of the profile scanning window where the calculated number of gray-level detection areas becomes a maximum with respect to their neighborhood, as a position of the circular arc shape of the object; and recognizing the position of the object from the detected position of the circular arc shape thereof.

2. The method claimed in claim 1, wherein when the object has a plurality of circular arc shapes on its profile, in the scanning step, the scanning operation is carried out by using one profile scanning window composed of the plurality of gray-level detection areas crossing the imaginary scanning circular profile corresponding to the circular arc shapes on the gray image, and in the recognizing step, the object is identified and a position and a direction of the object are recognized based on relative positional relationship among positions of the plurality of circular arc shapes.

3. The method claimed in claim 1, wherein the object is a slot or an open hole for screwing which has the circular arc shape.

4. The method claimed in claim 1, wherein the object is a slot for screwing which has the circular arc shapes.

5. The method claimed in claim 1, wherein in the picking up step, a first image of a first object which is a slot or an open hole having a circular arc shape as at least part of its profile, and a second image of a second object which is a hole having a circular arc shape as at least part of its profile, are picked up by an image pickup device, then the converting, scanning, calculating, determining, and detecting steps are carried out on each of the picked-up first and second images, and positions of the first and second objects are recognized from the detected positions of the circular arc shapes thereof so as to decide whether or not screwing is appropriate, depending on the recognition result.

6. A computer implemented method of recognizing a position of an object, comprising the steps of:

picking up an image of an object having a circular arc shape as at least part of its profile, by an image pickup device;

converting image information of the picked-up image into gray image data and storing the gray image data in a storage device;

scanning the stored gray image data with a profile scanning window composed of a plurality of gray-level detection areas crossing an imaginary scanning circular profile corresponding to the circular arc shape on the gray image and arranged circularly along the imaginary scanning circular profile and using it to measure a gray-level representative value of an inner-side gray-level detection area and a gray-level representative value of an outer-side gray-level detection area which are inside and outside of the scanning circular profile;

calculating, at each scanning position during scanning and for each gray-level detection area, an absolute value of a difference between the measured gray-level representative value of the inner-side gray-level detection area and the measured gray-level representative value of the outer-side gray-level detection area;

summing up the absolute values of all of the gray-level detection areas;

detecting a position of the profile scanning window where the summed absolute values of all of the gray-level detection areas becomes a maximum with respect to their neighborhood, as a position of the circular arc shape of the object; and recognizing the position of the object from the detected position of the circular arc shape thereof.

7. The method claimed in claim 6, wherein when the object has a plurality of circular arc shapes on its profile, in the scanning step, the scanning operation is carried out by using one profile scanning window composed of the plurality of gray-level detection areas crossing the imaginary scanning circular profile corresponding to the circular arc shapes on the gray image, and in the recognizing step, the object is identified and a position and a direction of the object are recognized based on relative positional relationship among positions of the plurality of circular arc shapes.

8. The method claimed in claim 6, wherein the object is a slot or an open hole for screwing which has the circular arc shape.

9. The method claimed in claim 7, wherein the object is a slot for screwing which has the circular arc shape.

10. The method claimed in claim 6, wherein:

in the picking up step, a first image of a first object which is a slot or an open hole having a circular arc shape as at least part of its profile, and a second image of a second object which is a hole having a circular arc shape as at least part of its profile, are picked up by an image pickup device, then the converting, scanning, calculating, determining, and detecting steps are carried out on each of the picked-up first and second images, and positions of the first and second objects are recognized from the detected positions of the circular arc shapes thereof so as to decide whether or not screwing is appropriate, depending on the recognition result.

11. The method claimed in claim 1, further comprising the steps of:

detecting two end points on the scanning circular profile where a sequence of such gray-level detection areas in which the absolute value of the difference is larger than the specified gray-level threshold value cease continuing;

recognizing an opening direction of the circular arc shape from positions of the detected end points; and recognizing a direction toward which the object is directed, by the recognized opening direction.

12. The method claimed in claim 11, further comprising, after recognizing the direction toward which the object is directed, the steps of:

restricting a search range for a next to-be-recognized position of the object based on the recognized direction;

detecting the next to-be-recognized position from the restricted search range; and recognizing the position and direction of the object from the position of the circular arc shape and the next to-be-recognized position.

13. The method claimed in claim 3, wherein when the position of the object is recognized from the detected position of the circular arc shape thereof, a direction of the slot or an opening direction of the open hole is also recognized from distributed positions of the gray-level detection areas at the detected position of the circular arc shape.

14. The method claimed in claim 1, wherein the gray-level representative value of the inner-side gray-level detection area is a total value of a specified number of inner-side image gray-level measuring points constituting the inner-side gray-level detection area and the gray-level representative value of the outer-side gray-level detection area is a total value of the same number of outer-side image gray-level measuring points constituting the outer-side gray-level detection area as that of the inner-side image gray-level measuring points.

15. The method claimed in claim 1, wherein the gray-level representative value of the inner-side gray-level detection area is an average value of a specified number of inner-side image gray-level measuring points constituting the inner-side gray-level detection area and the gray-level representative value of the outer-side gray-level detection area is an average value of a specified number of outer-side image gray-level measuring points constituting the outer-side gray-level detection area.

16. The method claimed in claim 1, wherein the gray-level representative value of the inner-side gray-level detection area is a value selected from inner-side image gray-level measuring points constituting the inner-side gray-level detection area and the gray-level representative value of the outer-side gray-level detection area is a value selected from outer-side image gray-level measuring points constituting the outer-side gray-level detection area.

17. The method claimed in claim 3, further comprising the steps of:
   calculating a gripping point and direction of a screw to be screwed into the object; and
   outputting the coordinates of the gripping point and an angle of the direction of the screw to external equipment.

18. The method claimed in claim 7, further comprising the steps of:
   calculating a gripping point and direction of a screw to be screwed into the object; and
   outputting the coordinates of the gripping point and an angle of the direction of the screw to external equipment.

* * * * *